United States Patent [19]

Kunii et al.

[11] Patent Number: 4,649,442
[45] Date of Patent: Mar. 10, 1987

[54] AUTOMATIC PROGRAM SELECTOR OF A VIDEO TAPE RECORDER

[75] Inventors: Hideo Kunii; Katsumi Matsumoto, both of Fukaya, Japan

[73] Assignee: Kabushiki Kaisha Toshiba, Kawasaki, Japan

[21] Appl. No.: 822,134

[22] Filed: Jan. 24, 1986

[30] Foreign Application Priority Data

Jan. 26, 1985 [JP] Japan .................................. 60-13075

[51] Int. Cl.$^4$ ............................................ G11B 15/00
[52] U.S. Cl. .................................... 360/72.2; 360/74.4
[58] Field of Search ...................... 360/72.1, 72.2, 74.4

[56] References Cited

U.S. PATENT DOCUMENTS 4,551,774 11/1985 Sakaguchi et al. ................. 360/72.1

FOREIGN PATENT DOCUMENTS 2107106A 4/1983 United Kingdom .

Primary Examiner—George G. Stellar
Attorney, Agent, or Firm—Cushman, Darby & Cushman

[57] ABSTRACT

A program selection signal is recorded in a program recording start portion of a magnetic tape by a recording magnetic head. When a program selection request is produced at a keyboard, a control circuit fast-forwards or rewinds the magnetic tape in accordance with the keyed fast forward (FF) or rewind (REW) request. In the FF or REW mode, the program selection signal is detected by a reproducing magnetic head for reproducing the program selection signal. In this case, the control circuit reproduces the detected program, and starts counting. If no operation is made from the keyboard in a predetermined period of time, the control circuit resumes the FF or REW modes so as to cause the reproducing magnetic head to detect the next program selection signal.

5 Claims, 4 Drawing Figures

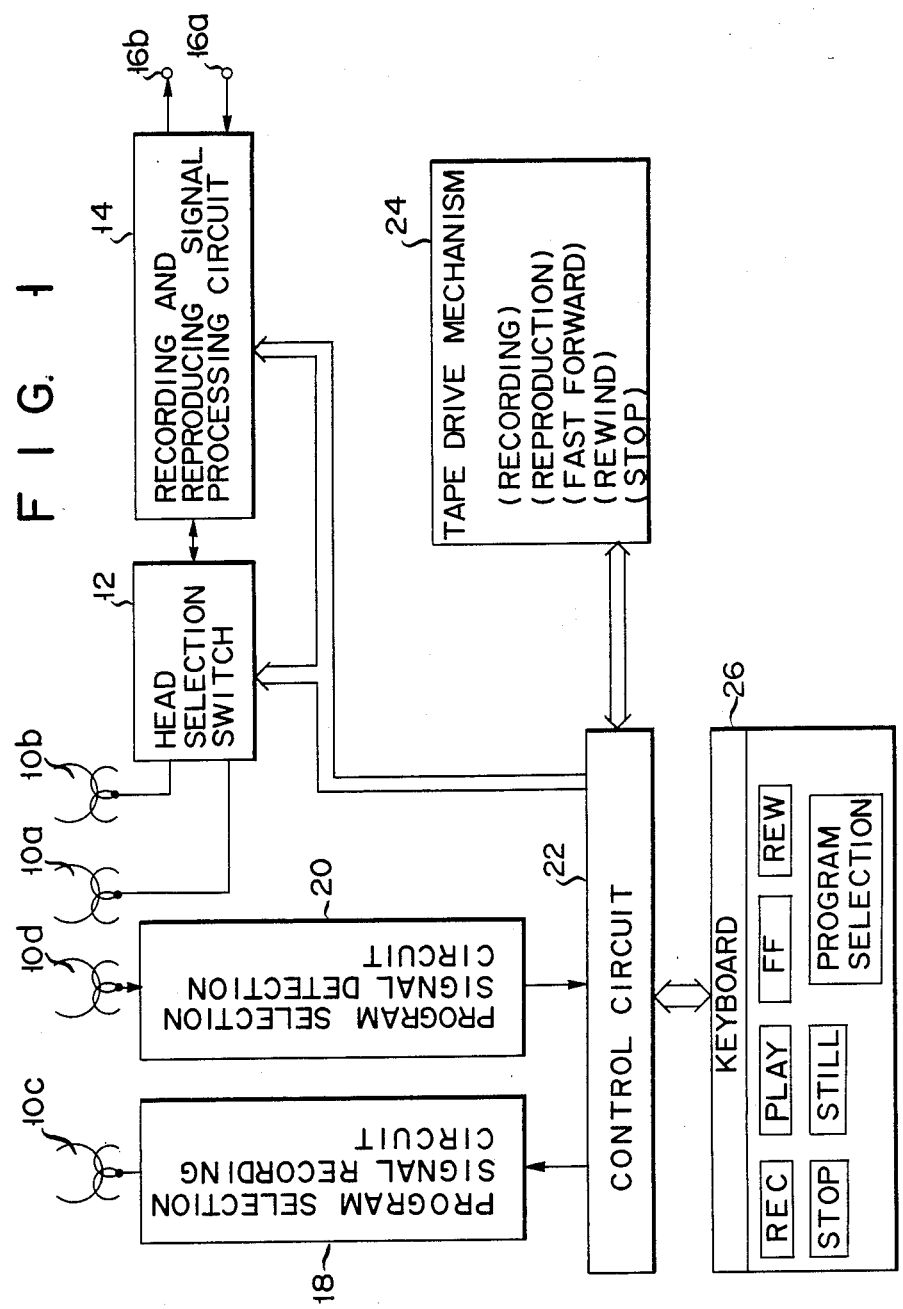

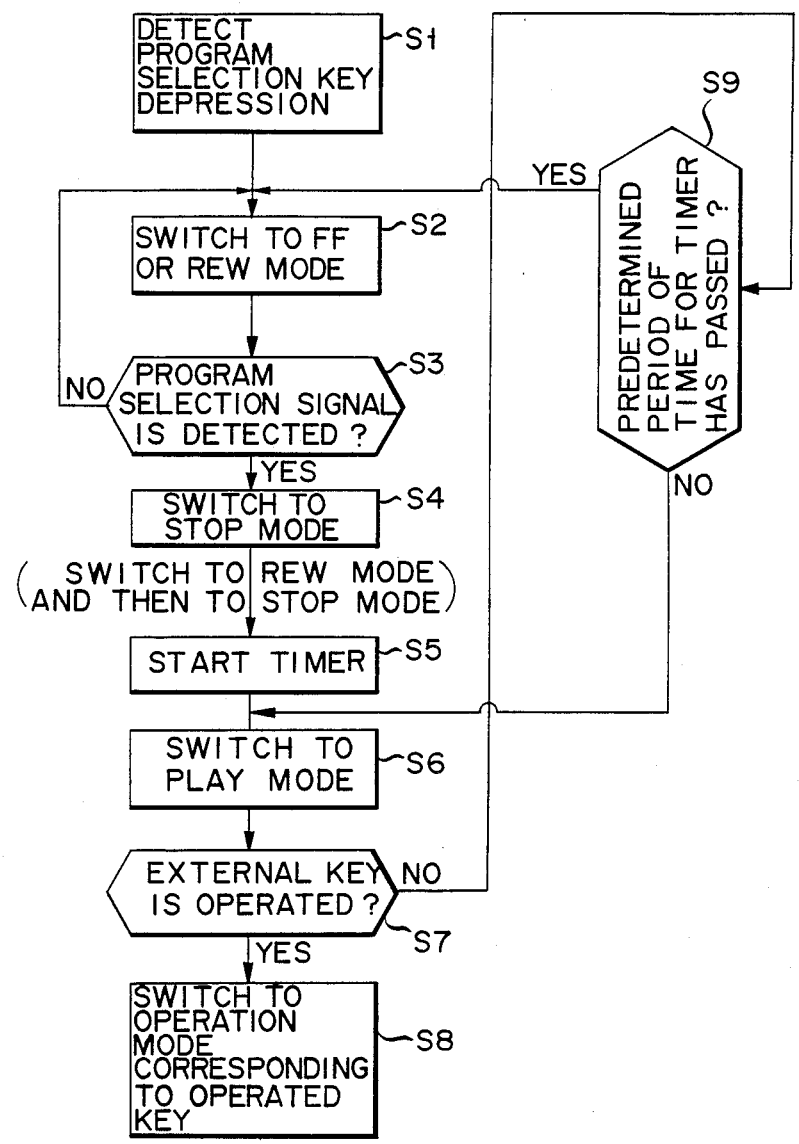

AUTOMATIC PROGRAM SELECTOR OF A VIDEO TAPE RECORDER

BACKGROUND OF THE INVENTION

This invention relates to an automatic program selector of a video tape recorder (VTR) and, more particularly, to an automatic program selector of a VTR in which a magnetic tape is drawn out to the side of a rotating head unit in recording (REC) and play (PLAY) modes, and is not drawn out in stop (STOP), fast forward (FF), and rewind (REW) modes.

A conventional VTR provided with a program selector for detecting a recording start position of any program recorded on a magnetic tape has been proposed. Such a program selector records a program selection signal over the entire width of the magnetic tape for a predetermined period of time when the recording operation starts, and reads out the recorded program selection during the fast-forwarding or rewinding of the magnetic tape, thereby detecting the recording start position. Another program selector in which the program selection signal is recorded by changing a duty of a control signal for a predetermined period of time has also been proposed.

In such a program selector, when the above-mentioned program selection signal is detected, the magnetic tape is stopped. At this time, when a user depresses a key for selecting the PLAY mode, the VTR is switched to the PLAY mode and the user can confirm a recorded content. When an unwanted recorded content is reproduced, the user depresses a key for selecting the FF or REW mode, and the magnetic tape again travels at high speed. Since the VTR is set in the STOP mode every time a recording start position is detected, keys must be depressed frequently in order to confirm the recorded content and to detect the next recording start position In particular, since video cassette tapes for a longperiod recording have been used increasingly, a large number of programs tend to be recorded on a single tape. Thus, a considerable number of key operations is required for confirming all the recorded contents, resulting in inconvenient and time-consuming operation.

SUMMARY OF THE INVENTION

The present invention has been made, in consideration of these circumstances, to provide an automatic program selector of a video tape recorder wherein, every time a recording start signal is detected, the corresponding content is automatically reproduced, thereby allowing a user to check whether or not the reproduced program is the desired one.

In order to achieve the object of the present invention, a means is provided which allows a series of operations wherein, when a program selection signal is detected in the FF or REW mode, the magnetic tape is stopped so as to reproduce a beginning portion of a detected program for a predetermined period of time, and the FF or REW mode is automatically resumed if no key operation is made during the brief reproduction of the detected program.

BRIEF DESCRIPTION OF THE DRAWINGS

FIGS. 1 to 3 show an embodiment of an automatic program selector of a video tape recorder according to the present invention, in which:

FIG. 1 is a block diagram showing an arrangement of an automatic program selector of a video tape recorder according to the present invention;

FIG. 2 is a flow chart for explaining the operation of the main part of the selector shown in FIG. 1; and FIGS. 3A and 3B are views showing an arrangement of a video tape recorder to which the present invention is applied, in which FIG. 3A shows REC and PLAY modes, and FIG. 3B shows STOP, FF, and REW modes.

DETAILED DESCRIPTION OF THE PREFERRED EMBODIMENT

Figure 3A:
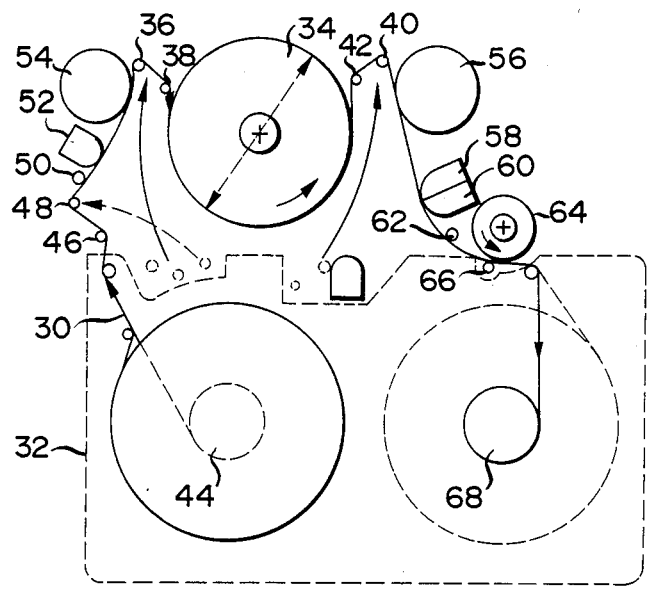

One embodiment of the present invention will now be described in detail with reference to the accompanying drawings.

FIG. 1 is a block diagram showing the arrangement of an automatic program selector of a video tape recorder (VTR) according to the present invention. Referring to FIG. 1, reference numerals 10a and 10b denote a recording magnetic head and a reproducing magnetic head. Heads 10a and 10b are connected to recording and reproducing signal processing circuit 14 by head selection switch 12. When a VTR is set in the REC mode, a recording video signal is supplied from input terminal 16a to processing circuit 14. In the PLAY mode, circuit 14 supplies a reproducing video signal to output terminal 16b. Reference numerals 10c and 10d denote magnetic heads for respectively recording and reproducing a program selection signal. Recording magnetic head 10c is connected to program selection signal recording circuit 18, and reproducing magnetic head 10d is connected to program selection signal detection circuit 20.

Reference numeral 22 denotes a control circuit for controlling the overall system of the present invention. A signal from control circuit 22 is supplied to switch 12, circuit 14, and tape drive mechanism 24, so as to set the operating modes of the system. Tape drive mechanism 24 drives a magnetic tape in accordance with the REC, PLAY, FF, REW, and STOP modes of the VTR.

Control circuit 22 produces a program selection signal in order to record it at a recording start portion in the REC mode of the VTR. The program selection signal is supplied to magnetic head 10c through recording circuit 18, and is recorded on a deeper part of a magnetic layer of a magnetic tape. The REC mode of the VTR is determined by checking a signal from keyboard 26. Alternatively, when an automatic REC mode is set, the program selection signal can be produced for a predetermined period of time by checking a signal from an automatic recording timer (not shown). Keyboard 26 has keys for selecting various modes (e.g., REC, PLAY, FF, REW, STOP, STILL, and PROGRAM SELECTION modes) which are operated by a user.

The program selector of the present invention has the above arrangement and makes a characteristic PROGRAM SELECTION operation. FIG. 2 is a flow chart for explaining the PROGRAM SELECTION operation. When a PROGRAM SELECTION key of keyboard 26 is depressed, control circuit 22 detects the key depression (step 1). Control circuit 22 first switches the VTR to the FF or REW mode (step 2). In this case, the FF or REW mode is determined upon operation of the FF or REW key by the user together with the PROGRAM SELECTION key. Next, control circuit 22 checks the presence/absence of a program start signal (step 3). If NO in step 3, the flow returns to step 2. If YES in step 3, control circuit 22 switches the VTR to the STOP mode (step 4), and then starts a timer (not shown) which is provided in or separately from circuit 22 (step 5). Control circuit 22 switches the VTR to the PLAY mode (step 6). In this mode, the presence/absence of external key operations is checked (step 7). Step 7 is executed so that a program is reproduced from the detected position so as to allow the user to check if that program is the desired one. If YES in step 7, the user operates, e.g., the PLAY key, STILL key, or the like. In this case, the VTR is switched to the operation mode corresponding to the user's keyed operation (step 8).

However, if NO in step 7, control circuit 22 checks if a predetermined period of time has elapsed on the timer (step 9). If NO in step 9, the PLAY operation of step 6 is continued. If YES in step 9, the flow returns to step 2, and the next program selection operation is performed. Such an operation sequence can be automatically obtained. Therefore, the user need only observe a reproduced program, and check if it is the desired program.

In the above description, when a program selection signal is detected, after step 3, STOP processing of step 4, and timer start processing of step 5 are completed, the operation sequence is switched to the PLAY mode for allowing the user to check the detected program. In practice, however, before switching to the PLAY mode, the REW and STOP modes in step 5A are executed. This is because recording and reproducing heads 10c and 10d are independently mounted at different positions, as shown by numerals 52 and 70 in FIGS. 3A and 3B.

Figure 3B:
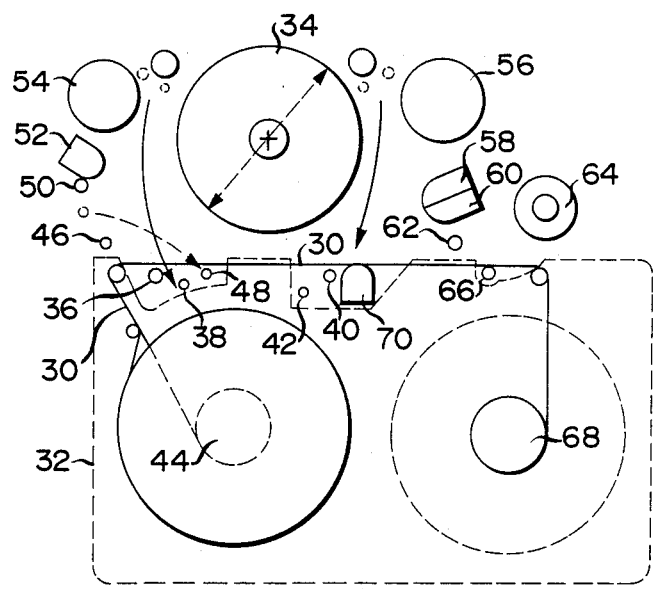

FIG. 3A shows a tape loading state in the REC and PLAY modes, and FIG. 3B shows a tape state in the STOP, FF, and REW modes.

As shown in FIG. 3A, tape 30 is drawn from cassette 32 in the REC and PLAY modes or normal-speed mode, and is brought into contact with a drum of rotating head unit 34. Tape 30 is drawn out in such a manner that loading poles 36, 38, 40, and 42 are moved to the two sides of unit 34 while drawing out tape 30. More specifically, tape 30 travels from supply reel 44 to takeup reel 68 along a travel path constituted by guidepost 46, tension pole 48, guidepost 50, entire width erasing/program selection signal recording head 52, impedance roller 54, loading poles 36 and 38, rotating head unit 34, loading poles 42 and 40, impedance roller 56, voice signal erasing head 58, voice and control signal recording/reproducing head 60, guidepost 62, pinch roller 64, and capstan 66.

In the FF and REW modes or high-speed mode, loading poles 36, 38, 40, and 42 and tension pole 48 are withdrawn into a tape drawing out opening of cassette 32, as shown in FIG. 3B. Pinch roller 64 is separated from capstan 66. In this state, the travel path is formed in the tape drawing out opening, and the tape will not be drawn out to the side of rotating head unit 34. In this state, a reel motor (not shown) is controlled, thus enabling the FF and REW modes.

As shown in FIG. 3B, head 70 for reproducing the program selection signal is mounted in the tape drawing out opening. Therefore, in the FF and REW modes, head 70 is brought into contact with a rear surface of tape 30, and detects the recorded program selection signal. This is possible because the recorded program selection signal is recorded on a deeper part of the magnetic layer.

In the above-mentioned VTR, the program selection signal is recorded by head 52, and is reproduced by head 70, separated therefrom. As a result, the positional relationship between the recorded video signal and the program selection signal differs when the program selection signal is recorded and reproduced.

For example, when the program selection operation is performed in the FF mode and the program selection signal is reproduced, a recorded video image portion corresponding to this signal has already been taken up by takeup reel 68. Therefore, in order to reproduce the recorded video image portion corresponding to the program start signal, a predetermined length of tape 30 must be rewound, and then set in the PLAY mode for confirmation. Thus, a short tape REW operation must be included between steps 4 and 5 or steps 5 and 6 of FIG. 2.

In the above embodiment, head 10c is also used as an entire width erasing head. However, the present invention is not limited to this. For example, control head 60 in the VTR can be used as head 10c so as to utilize a change in control pulse duty ratio as program selection data.

Thus, according to the present invention, there is provided an automatic program selector of a video tape recorder, wherein every time a recording start portion is detected, the detected portion is reproduced for a predetermined period of time, and a user can check if the reproduced portion is a desired program, thus greatly reducing a user's labor in selecting program.

What is claimed is:

1. An automatic program selector of a video tape recorder in which a magnetic tape is drawn out from a cassette in a normal-speed travel mode, and is not in a high-speed travel mode, comprising:

program selection signal recording means for recording a program selection signal on a magnetic tape to correspond with a program recording portion;

program selection signal reproducing means for reproducing the program selection signal in the high-speed travel mode;

external operation means having operation means for requesting at least program selection mode, high-speed travel mode and normal-speed travel mode, for producing a request signal in accordance with the selected mode;

first control means connected to said external operation means for producing, in accordance with the program selection request signal from said external operation means, a signal for driving the magnetic tape at high speed;

program selection signal detection means connected to said reproducing means for detecting the reproduced program selection signal from said reproducing means;

second control means connected to said program selection signal detection means for producing a first control signal for temporarily stopping the magnetic tape, and thereafter producing a second control signal for driving the magnetic tape at normal speed;

time count means which starts counting in response to the first control signal and produces a predetermined time elapse signal after the count has reached a value corresponding to a predetermined period of time; and third control means for detecting the request signal from said external operation means for the predetermined period of time in the normal-speed travel mode set by the second control signal, so as to continue the normal-speed travel mode upon supply of the normal-speed travel request signal, and to produce a third control signal for resuming the high-speed travel mode in response to the predetermined time elapse signal if no request signal is supplied in the predetermined period of time.

2. A selector according to claim 1, wherein said program selection signal reproducing means includes a magnetic head which is brought into contact with the magnetic tape in the high-speed travel mode.

3. A selector according to claim 2, wherein the program selection signal is recorded on a deeper part of the magnetic tape, and said magnetic head is brought into contact with the rear surface of the magnetic tape so as to detect the program selection signal recorded on the deeper part of the magnetic tape from the rear surface thereof.

4. A selector according to claim 1, wherein said second control means produces a fourth control signal for rewinding the magnetic tape by a predetermined length after the first control signal is generated and before the second control signal is generated.

5. A selector according to claim 1, wherein said time count means is included in said second control means.

* * * * *